United States Patent
Mandyam

(10) Patent No.: US 10,142,385 B2
(45) Date of Patent: Nov. 27, 2018

(54) MULTI-SERVICE INITIALIZATION FOR ADAPTIVE MEDIA STREAMING

(71) Applicant: QUALCOMM Incorporated, San Diego, CA (US)

(72) Inventor: Giridhar Dhati Mandyam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 270 days.

(21) Appl. No.: 15/018,929

(22) Filed: Feb. 9, 2016

(65) Prior Publication Data
US 2016/0269458 A1    Sep. 15, 2016

Related U.S. Application Data

(60) Provisional application No. 62/130,754, filed on Mar. 10, 2015.

(51) Int. Cl.
*H04L 29/06* (2006.01)
*H04L 29/08* (2006.01)

(52) U.S. Cl.
CPC ........ *H04L 65/601* (2013.01); *H04L 65/1016* (2013.01); *H04L 65/1036* (2013.01); *H04L 65/4076* (2013.01); *H04L 65/4084* (2013.01); *H04L 65/602* (2013.01); *H04L 65/604* (2013.01); *H04L 65/80* (2013.01); *H04L 67/02* (2013.01)

(58) Field of Classification Search
CPC .... H04L 65/601; H04L 65/4076; H04L 67/02
USPC ....................... 709/219, 203, 200
See application file for complete search history.

(56) References Cited

U.S. PATENT DOCUMENTS

| | | | | |
|---|---|---|---|---|
| 6,049,316 A | * | 4/2000 | Nolan | G09G 5/006 345/698 |
| 2007/0019588 A1 | * | 1/2007 | Cho | H04B 7/2628 370/335 |
| 2013/0036234 A1 | * | 2/2013 | Pazos | H04L 12/189 709/231 |
| 2015/0215417 A1 | * | 7/2015 | Chetlur | G06F 17/30902 709/213 |

(Continued)

OTHER PUBLICATIONS

"3rd Generation Partnership Project; Technical Specification Group Services and System Aspects; Multimedia Broadcast/Multicast Service (MBMS); Protocols and codecs (Release 12)", 3GPP Standard; 3GPP TS 26.346, 3rd Generation Partnership Project (3GPP), Mobile Competence Centre; 650, Route Des Lucioles; F-06921 Sophia-Antipolis Cedex; France, vol. SA WG4, No. V12.4.0, Dec. 15, 2014 (Dec. 15, 2014), pp. 1-207, XP050927225, [retrieved on Dec. 15, 2014].

(Continued)

*Primary Examiner* — El Hadji M Sall
(74) *Attorney, Agent, or Firm* — The Marbury Law Group

(57) ABSTRACT

Systems, methods, and devices of various embodiments enable transmitting and receiving media content in a communication system. A processor of a communication device may receive an initialization segment associated with a first media broadcast. The processor may request a second media broadcast. The processor may receive an indication that the initialization segment is also associated with the second media broadcast. The processor may process the second media broadcast using the initialization segment.

22 Claims, 6 Drawing Sheets

(56) References Cited

U.S. PATENT DOCUMENTS

2015/0270979 A1* 9/2015 Andrada ............... H04L 51/38
  370/390

OTHER PUBLICATIONS

International Search Report and Written Opinion—PCT/US2016/017319—ISA/EPO—dated May 31, 2016.

* cited by examiner

MULTI-SERVICE INITIALIZATION FOR ADAPTIVE MEDIA STREAMING

RELATED APPLICATIONS

This application claims the benefit of priority to U.S. Provisional Application No. 62/130,754 entitled "Multi-Service Initialization For Adaptive Media Streaming" filed Mar. 10, 2015, the entire contents of which are hereby incorporated by reference.

BACKGROUND

Adaptive bitrate streaming is a technique used in streaming media data (such as video, audio, and other multimedia data) over a communication network. Examples of adaptive bitrate streaming techniques include Adobe Dynamic Streaming for Flash, Apple Hypertext Transfer Protocol (HTTP) Adaptive Streaming, Microsoft Smooth Streaming, and Dynamic Adaptive Streaming over HTTP (DASH). DASH is a streaming standard supporting adaptive streaming using HTTP. Some adaptive bit rate streaming techniques, such as DASH, make use of an initialization segment as part of a rate adaptation mechanism. A media presentation (i.e., media content data) may be divided into one or more periods. Each period may include an initialization segment and one or more media segments. The initialization segment may contain metadata used by the media segments in a representation. The metadata may include metadata needed to initialize the media content, for example, sample descriptors, tractor descriptors, and digital rights management (DRM)-related information. The initialization segment may be sent together with and/or separately from the media segments.

Streamed media content data is received and rendered by a client application, such as a streaming media client of a receiving communication device. When a client application first requests media content, the client application typically receives or retrieves a new initialization segment. The client application may then perform a reconfiguration using information in the initialization segment. However, in some cases, an initialization segment associated with newly requested media content may be substantially similar or functionally similar to a previously requested initialization segment, causing both communication bandwidth and client application processing cycles to be used unnecessarily.

SUMMARY

Various embodiments include methods and devices that enable transmitting by a content server, and receiving by a communication device, media content in a communication system. Methods according to various embodiments may include receiving, by a processor of the communication device, an initialization segment associated with a first media broadcast, requesting, by the processor, a second media broadcast, receiving, by the processor, an indication that the initialization segment is also associated with the second media broadcast, and processing, by the processor, the second media broadcast using the initialization segment. Some embodiments may further include preventing, by the processor, retrieval of the second initialization segment in response to receiving the indication that the initialization segment is also associated with the second media broadcast.

In some embodiments, the indication that the initialization segment is also associated with the second media broadcast may include a flag in a service parameter description of the second media broadcast. In some embodiments, the flag in the service parameter description of the second media broadcast may include a flag in a User Service Description (USD) associated with the second media broadcast.

Some embodiments may further include receiving, by the processor, an expiry indication of the initialization segment, requesting, by the processor, a second initialization segment in response to receiving the expiry indication, and processing, by the processor, the second media broadcast using the second initialization segment.

Methods according to various embodiments may also include providing, by a processor of a content server in a communication network, an initialization segment associated with a first media broadcast, receiving, by the content server processor, a request from a receiving communication device for a second media broadcast, and providing, by the content server processor, an indication that the initialization segment is also associated with the second media broadcast, in which the indication that the initialization segment is also associated with the second media broadcast enables the receiving communication device to process the second media broadcast using the initialization segment.

In some embodiments, the indication that the initialization segment is also associated with the second media broadcast may include a flag in a service parameter description of the second media broadcast. In some embodiments, the flag in the service parameter description of the second media broadcast may include a flag in a USD associated with the second media broadcast. Some embodiments may include providing, by the content server processor to the receiving communication device, an expiry indication of the initialization segment, receiving, by the content server processor from the receiving communication device, a request for a second initialization segment in response to providing the expiry indication, and transmitting, by the content server processor to the receiving communication device, the second initialization segment, in which the second initialization segment enables the receiving communication device to process the second media broadcast using the initialization segment.

Some embodiments may further include providing, by the content server processor to the receiving communication device, a notification that a frequency of the initialization segment is being changed or identifying a changed initialization segment frequency, transmitting, by the content server processor to the receiving communication device, initialization segments at the changed initialization segment frequency, and receiving, by the content server processor from the receiving communication device, the initialization segments at the changed initialization segment frequency. In such embodiments, providing, by the content server processor to the receiving communication device, a notification that the frequency of the initialization segment is being changed or identifying the changed initialization segment frequency may include changing a repetition interval value in a User Service Description. In such embodiments, providing, by the content server processor to the receiving communication device, the notification that the frequency of the initialization segment is being changed or identifying the changed initialization segment frequency further may include sending a separate notification to the receiving communication device.

Further embodiments include a communication device including a processor configured with processor-executable instructions to perform operations of the communication device methods summarized above. Further embodiments include a content server including a processor configured with processor-executable instructions to perform operations of the content server methods summarized above.

BRIEF DESCRIPTION OF THE DRAWINGS

The accompanying drawings, which are incorporated herein and constitute part of this specification, illustrate examples of various embodiments, and together with the general description given above and the detailed description given below, serve to explain the features of various embodiments.

DETAILED DESCRIPTION

Figure 1:
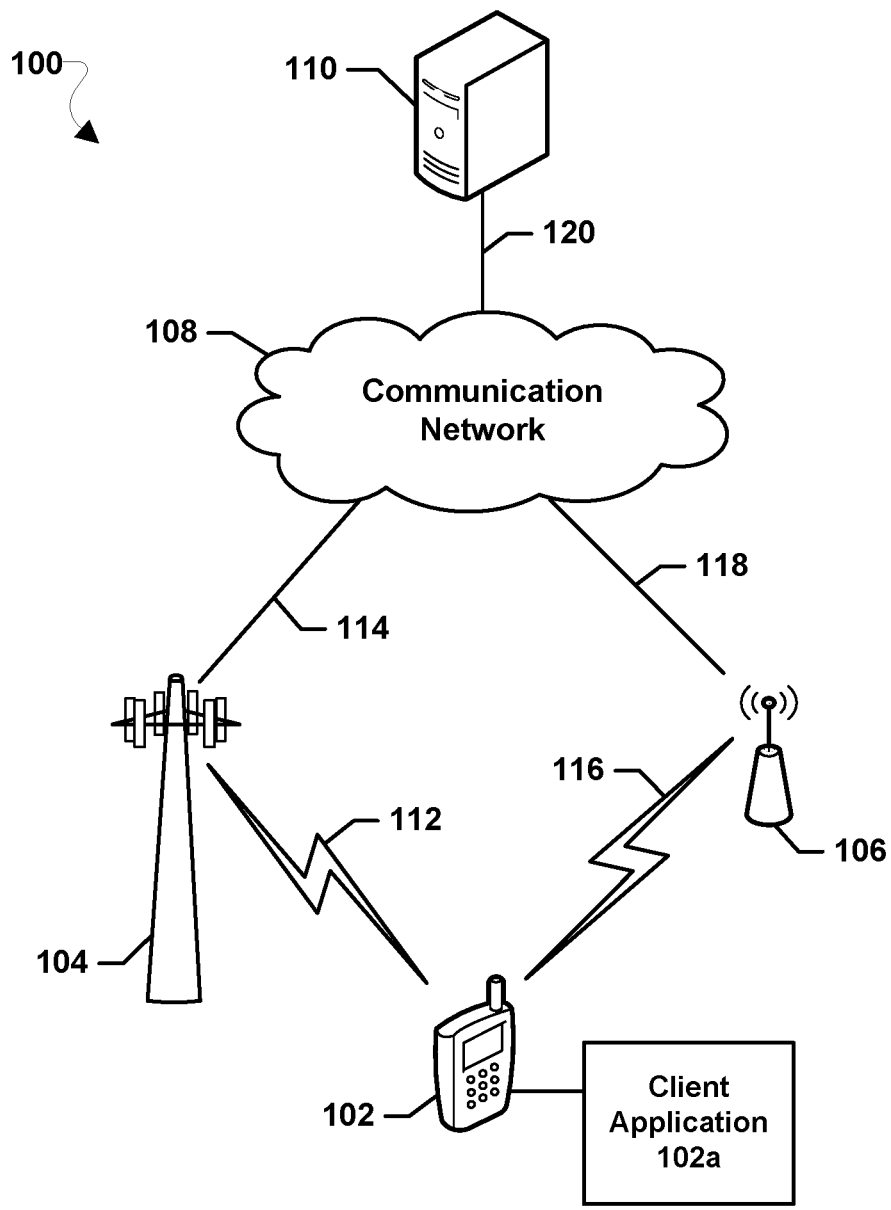
FIG. 1 is a block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

As used herein, the terms "communication device," "mobile communication device," "receiving communication device," and "receiver device" are used interchangeably herein to refer to any one or all of cellular telephones, smartphones, personal or mobile multimedia players, personal data assistants (PDAs), laptop computers, tablet computers, smartbooks, palmtop computers, wireless electronic mail receivers, multimedia Internet enabled cellular telephones, wireless gaming controllers, personal computers, television set top boxes, televisions, cable television receivers, and similar personal electronic devices which include a programmable processor and memory and circuitry for presenting media content.

Various embodiments are described herein using the term "content server." The term "content server" is used to refer to any computing device capable of functioning as a provider of content data, such as a master exchange server, web server, mail server, document server, or any other type of server. A content server may be a dedicated computing device or a computing device including a server component (e.g., running an application which may cause the computing device to operate as a server). A server component (e.g., server application) may be a full function server component, or a light or secondary server component (e.g., light or secondary server application) that is configured to provide synchronization services among the dynamic databases on mobile devices. A light server or secondary server may be a slimmed-down version of server type functionality that can be implemented on a mobile device thereby enabling the mobile device to function as an Internet server (e.g., an enterprise e-mail server) only to the extent necessary to provide the functionality described herein.

Streamed media content data may be requested by client application running on a receiving communication device from a content server, which may encode the requested media content according to an adaptive bit rate streaming technique, and may stream the media content to the client application, which may receive and render the streamed media content. Some adaptive bit rate streaming techniques, such as DASH, make use of an initialization segment as part of a rate adaptation mechanism. A media presentation (i.e., media content data) may be divided into one or more periods. Each period may include an initialization segment and one or more media segments. The initialization segment may contain metadata used by the media segments in a representation. The metadata may include metadata needed to initialize the media content, for example, sample descriptors, track descriptors, and digital rights management (DRM)-related information.

When the client application first requests media content (e.g., in a channel), the client application typically receives or retrieves a new initialization segment, and the client application may perform a reconfiguration using information in the initialization segment. When the client application subsequently requests new media content (e.g., when the client application switches channels), the client application may receive or retrieve a new initialization segment, and may perform a reconfiguration using information in the new initialization segment. However, the initialization segment associated with the newly requested media content may be substantially similar or functionally similar to the previously received initialization segment. In such cases, requesting and transmitting the new initialization segment, and performing the reconfiguration based on the new initialization segment, may waste both communication bandwidth and client application processing cycles.

To address these limitations in conventional content broadcast distribution schemes, systems, methods, and devices of various embodiments enable transmitting and receiving media content in a communication system by providing an indication that an initialization segment is a common initialization segment across two or more channels of media content. A communication device may request a first media broadcast, and receive from a content server an initialization segment associated with the first media broadcast, and the communication device may store in a memory (for example, a cache) the initialization segment. The receiving communication device may send to the content server a request for a second media broadcast. For example, the receiving communication device may change from a first channel of the first media broadcast to a second channel of the second media broadcast.

When requesting media content, a client application may first obtain a media description file, such as a Media Presentation Description (MPD) or other data description. The MPD may be delivered with the content data or in separate signaling. The MPD may include information such as program timing, media-content availability, media types, resolutions, minimum and maximum bandwidths, and the existence of various encoded alternatives of multimedia components, accessibility features and required digital rights management (DRM), media-component locations on the network, and other content characteristics. The MPD may define two types of data segments, namely initialization segments and media segments. Initialization segments provide a client application with metadata that describes the encoding of media content, and may include other information such as required DRM information, which the client application may require to process and present the media content. In a DASH media broadcast, a File Delivery Over Unidirectional Transport (FLUTE) transport session may be used to transmit both the initialization and media segments.

An initialization segment (i.e., the information in an initialization segment) may be common to (i.e., substantially the same as) more than one channel of media content. For example, the media content may be provided by the same content provider, or by related content providers. The content server may provide the initialization segment to the receiving communication device and provide an indication that the initialization segment associated with the first media broadcast is also associated with the second media broadcast. The receiving communication device may process the second media broadcast using the cached initialization segment. In some embodiments, a processor of the receiving communication device may prevent the receiving communication device (i.e., the client application running on the receiving communication device) from retrieving or requesting a second initialization segment that may be associated with the second media broadcast in response to determining that the client application has received an indication that the cached initialization segment is also associated with the second media broadcast.

The content server may provide, and the receiving communication device may receive, a service parameter description of media broadcasts (e.g., the first media broadcast and the second media broadcast). One example of the service parameter description is a User Service Description (USD) as may be used in DASH. The User Service Description is a service layer enhancement that may be used in a media content broadcast. The User Service Description may include, for example, content schedule information, and may define available services in a media broadcasts and/or broadcast channel. The User Service Description may also include an indication that an initialization segment is common to two or more media broadcasts (i.e., that information included in an initialization segment may be used by a streaming media client to process two or more different media broadcasts). A User Service Description may be associated with a media broadcasts and/or a channel of a media broadcast. The User Service Description may be transmitted to enable a receiving communication device to discover the services (i.e., media content) being broadcast on a channel. The User Service Description may be broadcast in an overhead transmission of a streaming media service.

Various embodiments may be implemented in wireless communication devices that may operate within a variety of communication systems 100, an example of which is illustrated in FIG. 1. A mobile communication device 102 may communicate with a communication network 108 that may include a base station 104, an access point 106, and a content server 110. The base station 104 may communicate with the communication network 108 over a wired or wireless communication link 114, and the access point 106 may communicate with the communication network 108 over a wired or wireless communication link 118. The communication links 114 and 118 may include fiber optic backhaul links, microwave backhaul links, and other communication links. In some embodiments, the communication network 108 may include a mobile telephony communication network.

The mobile communication device 102 may communicate with the base station 104 over a wireless communication link 112, and with the access point 106 over a wireless communication link 116. In some embodiments, the wireless communication link 112 may include a broadcast or multicast transmission, and the wireless communication link 116 may include a unicast transmission. The content server 110 may be an application server, a media server, or another network node or network element configured to provide content data for a client application 102a, e.g., on the mobile communication device 102. The client application 102a may include a streaming media client suitable for use in an adaptive bitrate streaming communication system.

The content server 110 may communicate with communication network over a wired or wireless communication link 120. The mobile communication device 102 may send requests for content data, such as video, audio, or multimedia content, to the content server 110 over the communication network 108, requesting delivery of the content data to the client application 102b. In response, the content server 110 may stream the requested content data to the mobile communication device 102 over one or more wired or wireless communication links 120. In some embodiments, the requested content data may include a media broadcast or a broadcast stream of content data. In some embodiments, the mobile communication device 102 may receive the requested content data over a single interface (e.g., over a cellular communication interface, or over a Wi-Fi communication interface). In some embodiments, the mobile communication device 102 may receive the content data over multiple interfaces (e.g., over Wi-Fi and cellular communication interfaces), and the mobile communication device 102 may receive multiple parallel streams over the multiple network interfaces.

The communication network 108 may support communications using one or more radio access technologies, and each of the wireless communication links 112 and 116 may include cellular connections that may be made through two-way wireless communication links using one or more radio access technologies. Examples of radio access technologies may include 3GPP Long Term Evolution (LTE), Worldwide Interoperability for Microwave Access (Wi-MAX), Code Division Multiple Access (CDMA), Time Division Multiple Access (TDMA), Wideband CDMA (WCDMA), Global System for Mobility (GSM), a radio access protocol in the Institute of Electrical and Electronics Engineers (IEEE) 802.11 family of protocols (e.g., Wi-Fi), Advanced Television Systems Committee (ATSC) 3.0, Digital Video Broadcasting (DVB)-T2, and other radio access technologies. While the communication links 112 and 116 are illustrated as single links, each of the communication links may include a plurality of frequencies or frequency bands, each of which may include a plurality of logical channels.

Figure 2:
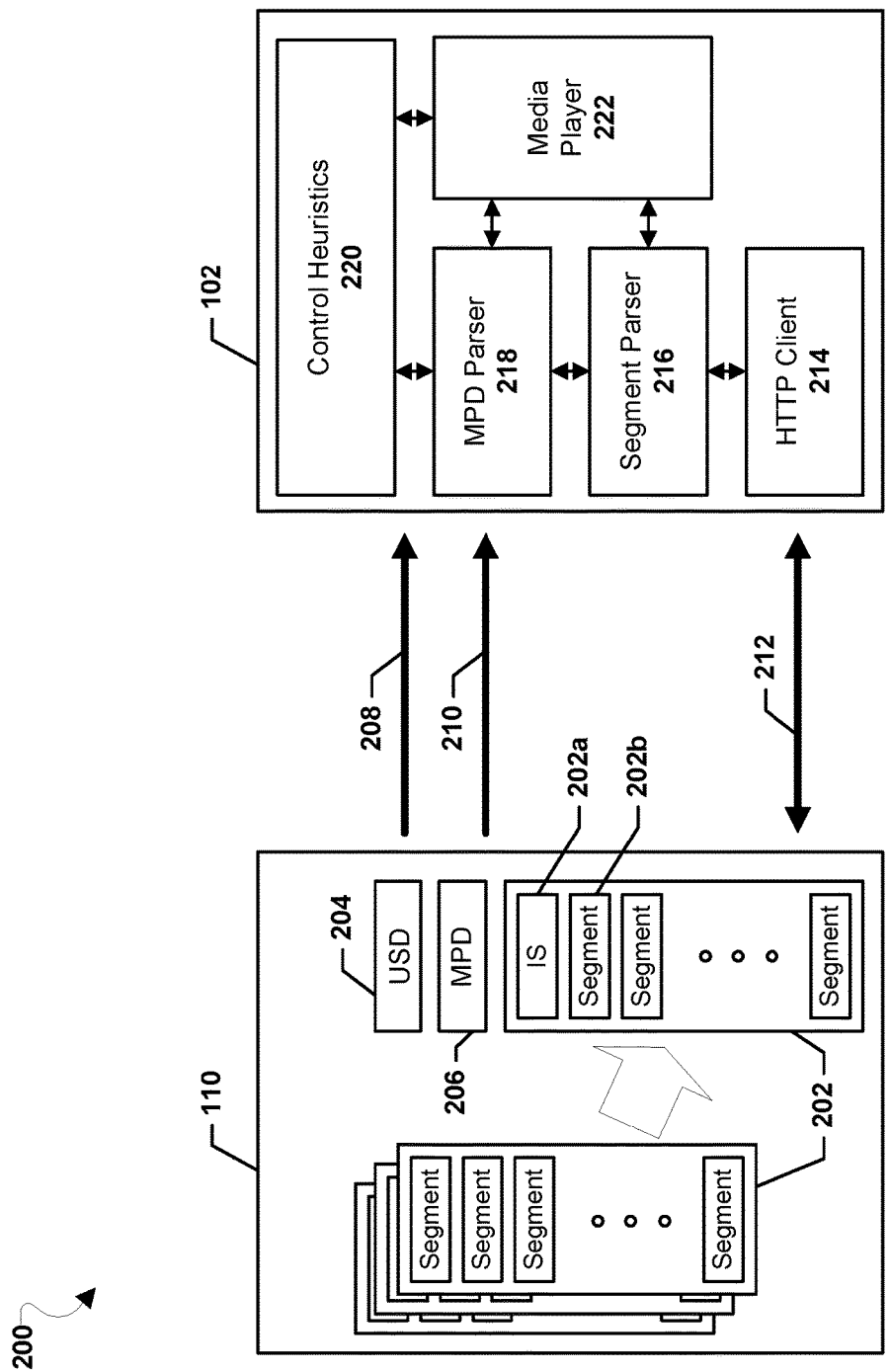
FIG. 2 is a block diagram of a communication system suitable for use with various embodiments.

FIG. 2 illustrates a communication system 200 suitable for use with various embodiments. With reference to FIGS. 1 and 2, the communication system 200 may include a content server (e.g., the content server 110) and a communication device (e.g., the mobile communication device 102). The content server 110 may have access to content data, which may include a plurality of media presentations 202. A media presentation may include an initialization segment (IS) 202a and a plurality of media segments 202b. The content server 110 may also include a service parameter description of media broadcasts, such as a USD 204, and a media description file, such as an MPD 206, or other data description. The USD 204 may be delivered 208 to the mobile communication device 102 in an overhead transmission of a streaming media service. The MPD 206 may be delivered 210 to the mobile communication device 102 with the media presentation (i.e., with the content data) or in separate signaling. The media presentations 202 may be provided 212 to the mobile communication device 102, e.g., by an HTTP content stream.

The mobile communication device 102 may include control heuristics 220 that may control the operation of an HTTP client 214, segment parser 216, an MPD parser 218, and a media player 222. The HTTP client 214 may request and receive the content data in the form of the media presentations 202. The MPD parser 218 may process the MPD 206 to obtain definitions of the initialization segment 202a and the media segments 202b. The segment parser 216 may process the media segments 202b to obtain the content data. The media player 222 (e.g., the client application 102a) may use definitions from the MPD 206 (such as timing information, data segment definitions, and other description information) to process and present content data provided by the segment parser 216.

Figure 3:
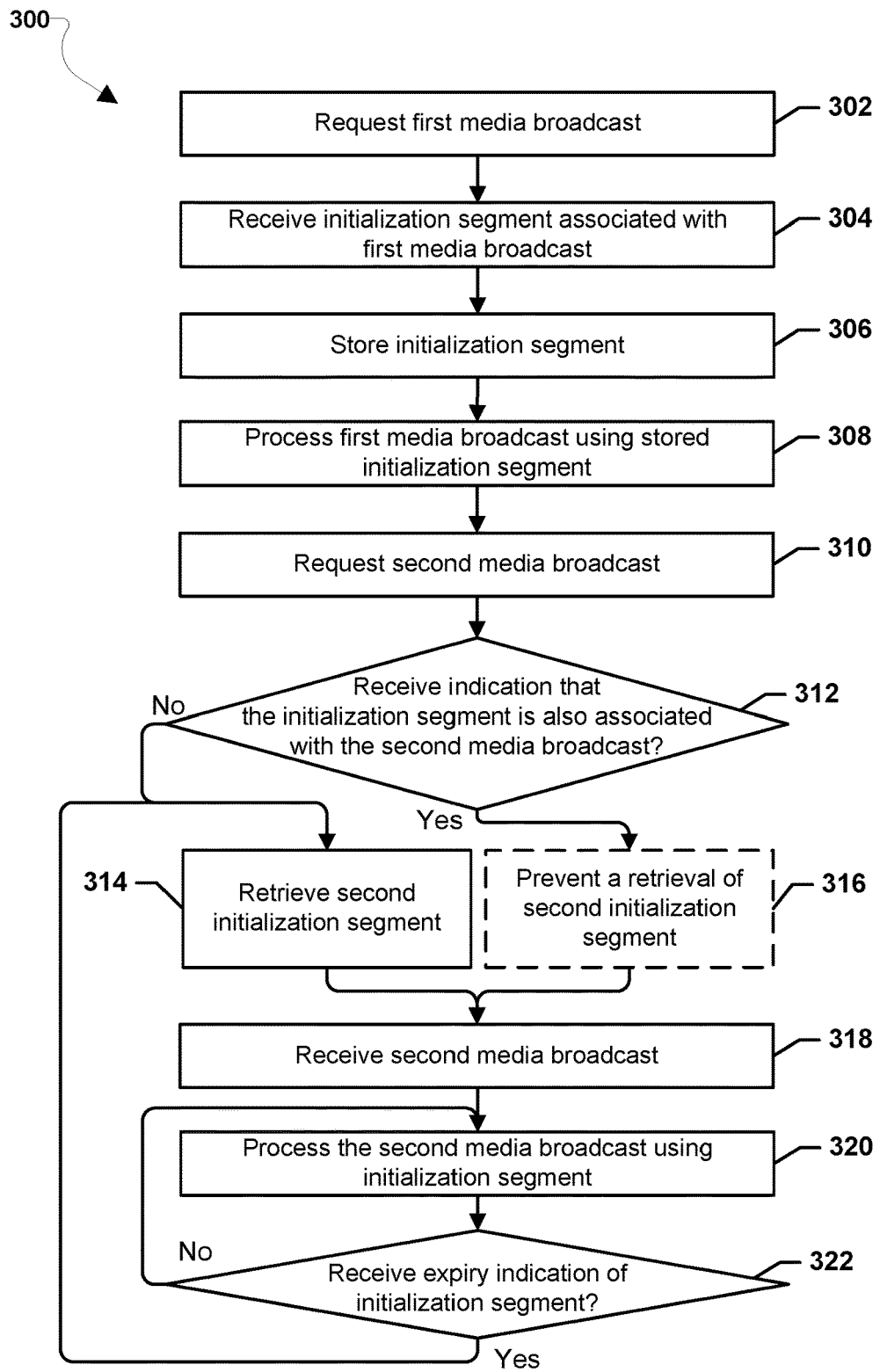
FIG. 3 is a process flow diagram illustrating a method for receiving media content in a communication device according to various embodiments.

FIG. 3 illustrates a method 300 for receiving media content in a communication device according to various embodiments. The method 300 may be implemented by a processor of a receiving communication device (e.g., the mobile communication device 102 of FIG. 1) or another similar processor.

With reference to FIGS. 1-3, in block 302, a processor of a communication device (e.g., the mobile communication device 102) may request a first media broadcast. In block 304, the processor of the communication device may receive an initialization segment associated with the first media broadcast. The initialization segment may contain metadata used by the media segments in a content data representation. The metadata may include metadata needed to initialize the media content, such as DRM-related information. In block 306, the processor of the communication device may store the initialization segment in a memory of the communication device. In block 308, the processor may process the first media broadcast using the stored initialization segment.

In block 310, the processor of the communication device may request a second media broadcast, for example, by sending a second media broadcast request. The second media broadcast request may include, for example, a channel change from a first channel over which the communication device receives the first media broadcast to a second channel over which the second media broadcast may be available.

In determination block 312, the processor may determine whether the processor has received an indication that the initialization segment that is stored in the memory of the communication device is also associated with the second media broadcast. For example, the processor of the communication device may parse a service parameter description, such as a USD, that describes the second media broadcast, and the processor may receive from the USD an indication that an initialization segment associated with the second media broadcast is substantially the same as the stored initialization segment (i.e., the initialization segment associated with the first media broadcast). In some embodiments, the indication may include a field in the USD indicating that the first media broadcast and the second media broadcast use a common initialization segment. In some embodiments, the USD may include a data association between an initialization segment and two or more media broadcasts. The data association may include an initialization segment identifier (e.g., an ISID) and two or more media broadcast identifiers (e.g., universally unique identifiers (UUID)), which may provide an indication to the processor of the communication device that the two or more media broadcasts are associated with a common initialization segment. In response to determining that the processor has not received an indication that the initialization segment is associated with the second media broadcast (i.e., determination block 312="No"), the processor may retrieve a second initialization segment associated with the second media broadcast from a content server (e.g., the content server 110) in block 314.

In response to determining that the processor has received an indication that the initialization segment is associated with the second media broadcast (i.e., determination block 312="Yes"), the processor may prevent a retrieval of the second initialization segment in optional block 316. For example, the processor may issue a command preventing the receiving communication device from requesting the second initialization segment from a content server.

In block 318, the processor may receive the second media broadcast, and in block 320 the processor may process the second media broadcast using an initialization segment. In the event that the cached initialization segment is a common initialization segment of the second media broadcast, the processor may use the cached initialization segment to process the second media broadcast. By using the cached initialization segment to process the second media broadcast, the processor may prevent communication bandwidth from being wasted on a request for and a transmission of an unnecessary initialization segment, and further the processor may prevent wasting processing cycles on a reconfiguration process using the unnecessary initialization segment. In the event that the cached initialization segment is not a common initialization segment of the second media broadcast, the processor may use the retrieved second initialization segment to process the second media broadcast.

In determination block 322, the processor may determine whether the receiving communication device has received an expiry indication of the initialization segment. For example, a content provider may wish to update information of the initialization segment, such as DRM-related information. As part of a content protection scheme, a content provider may periodically expire and update DRM credentials associated with a media broadcast. A content server transmitting media content associated with an initialization segment subject to expiration may transmit an expiry indication to a receiving communication device. The expiry indication may include, for example, an expiration time of the initialization segment to provide the receiving communication device with sufficient notice to retrieve and or request a second initialization segment.

In response to determining that the processor has not received an expiry indication of the initialization segment (e.g., determination block 322="No"), the processor may continue to process the second media content using the stored initialization segment in block 320. In response to determining that the processor has received an expiry indication of the initialization segment (e.g., determination block 322="Yes"), the processor may retrieve a second initialization segment in block 314.

Figure 4:
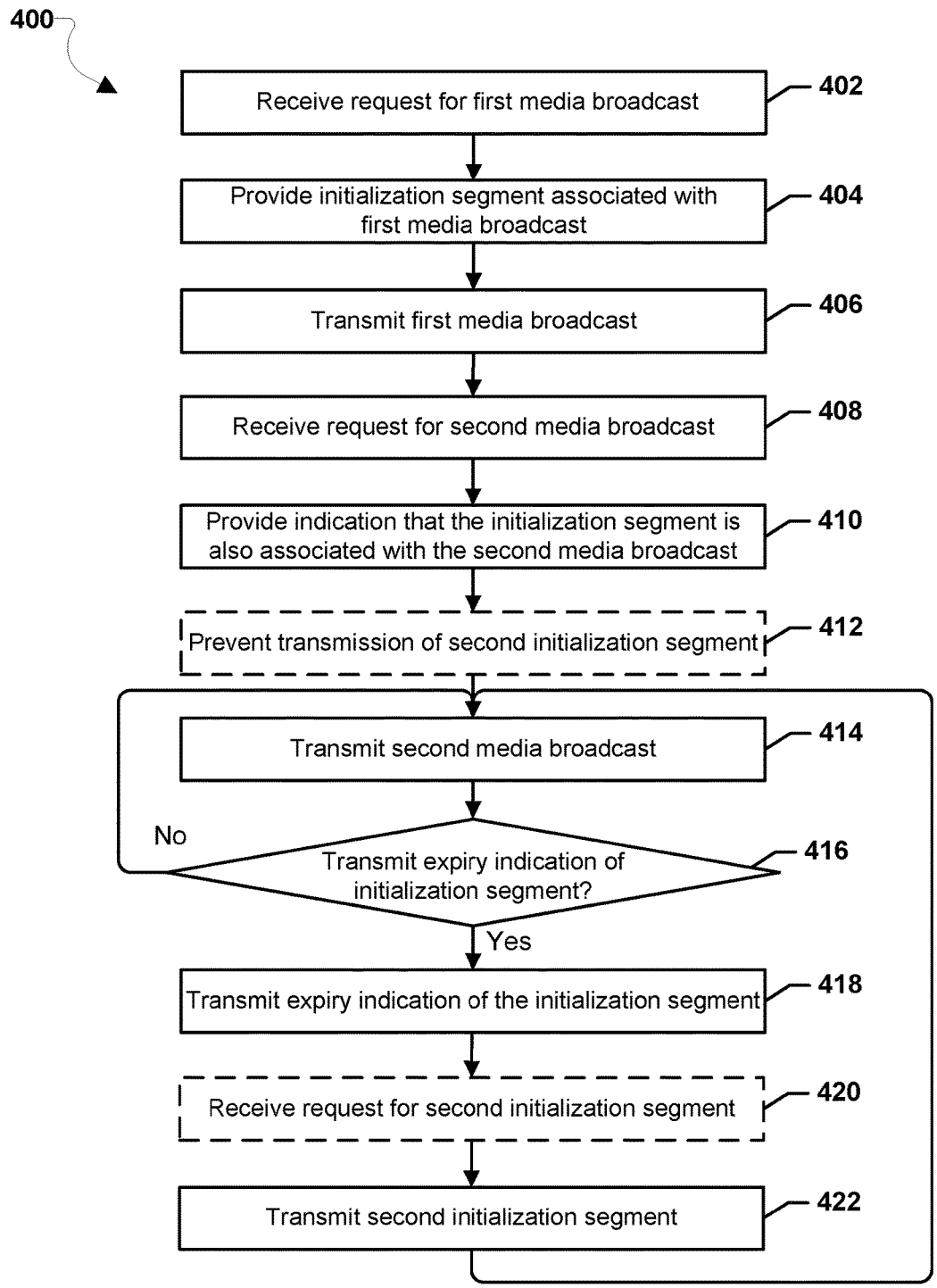
FIG. 4 is a process flow diagram illustrating a method for transmitting media content from a content server suitable for use with various embodiments.

FIG. 4 illustrates a method 400 for transmitting media content from a content server according to various embodiments. The method 400 may be implemented by a processor of a content server (e.g., the content server 110 of FIG. 1) or another similar processor.

With reference to FIGS. 1-4, in block 402, a processor of a content server (e.g., the content server 110) may receive a request a first media broadcast, e.g., from a receiving communication device (e.g., the mobile communication device 102). In block 404, the processor of the content server may provide an initialization segment associated with the first media broadcast. The metadata may include metadata needed by the receiving communication device to process and render the media content. In block 406, the processor of the content server may transmit the first media broadcast.

In block 408, the processor of the content server may receive a request for a second media broadcast. The second media broadcast request may include, for example, a channel change from a first channel over which the content server transmits the first media broadcast to a second channel over which the content server transmits the second media broadcast.

In block 410, the processor of the content server may provide an indication that the initialization segment is also associated with the second media broadcast. In some embodiments, the processor of the content server may provide the indication in a service parameter description, such as a USD. In addition to the indication that the initialization segment is also associated with the second media broadcast, the processor of the content server may decide to change the rate at which initialization segments are transmitted. For example, the processor of the content server may decrease the rate at which initialization segments are transmitted to further decrease a bandwidth utilization by superfluous (e.g., redundant) initialization segments. The processor of the content server may provide proper notification of this change to receiving communication devices through the USD and/or other mechanisms. In such embodiments, the processor of the content server may transmit a notification that a frequency of the initialization segment is being changed or identifying a changed initialization segment frequency. This notification may be received by the processor of the receiving communication devices. Thereafter, the processor of the content server may begin transmitting initialization segments at the changed initialization segment frequency, and receiving communication devices, so notified, may begin receiving the initialization segments at the changed initialization segment frequency. In some embodiments, a notification that a frequency of the initialization segment is being changed or identifying a changed initialization segment frequency may involve changing a repetition interval value (e.g., a <repetitionInterval> value or a similar value) in the USD. In some embodiments, a notification that a frequency of the initialization segment is being changed or identifying a changed initialization segment frequency may further include sending a separate notification to the receiving communication devices.

In optional block 412, the processor of the content server may prevent transmission of a second initialization segment associated with the second media broadcast. For example, despite providing the indication that a common initialization segment is associated with the first media broadcast and the second media broadcast, the content server may receive a request for a second initialization segment associated with the second media broadcast. To prevent the unnecessary use of communication link bandwidth, the processor of the content server may prevent transmission of the second initialization segment, even if the content server receives an affirmative request for the second initialization segment from the receiving communication device.

In block 414, the content server may transmit the second media broadcast. A receiving communication device that has stored the initialization segment may use the stored initialization segment to process the second media broadcast.

In determination block 416, the processor of the content server may determine whether to transmit an expiry indication of the initialization segment. For example, a content provider may wish to update information of the initialization segment, such as DRM-related information. In response to determining that the processor should not transmit an expiry indication of the initialization segment (e.g., determination block 416="No"), the processor may continue to transmit the second media broadcast in block 414. In response to determining that the processor should transmit an expiry indication of the initialization segment (e.g., determination block 416="Yes"), the processor may transmit an expiry indication of the initialization segment in block 418.

In optional block 420, the processor of the content server may receive a request for a second initialization segment. For example, in response to receiving the expiry indication, a receiving communication device may request a second initialization segment. In block 422, the processor of the content server may transmit the second initialization segment. In some embodiments, the processor of the content server may transmit the second initialization segment in response to receiving a request for the second initialization segment. In some embodiments, the processor of the content server may transmit the second initialization segment without receiving a request for the second initialization segment. The processor may continue to transmit the second media broadcast in block 414. The information in the second initialization segment may enable a receiving communication device to process the second media broadcast.

Figure 5:
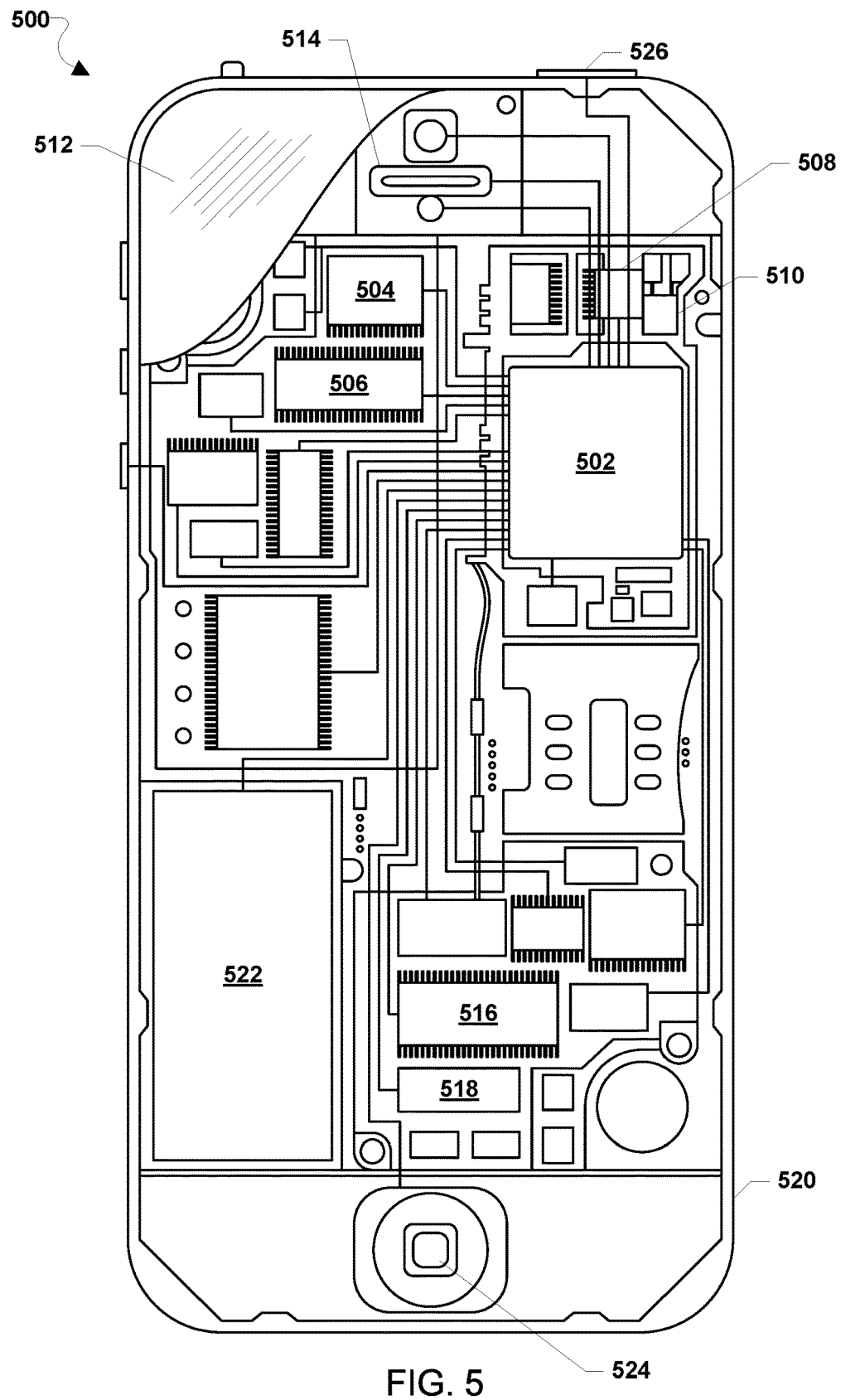
FIG. 5 is a component diagram of an example receiving communication device suitable for use with various embodiments.

Various embodiments, including the embodiment method described above with reference to FIG. 3, may be implemented in any of a variety of receiving communication devices, an example of which is illustrated in FIG. 5. For example, the mobile communication device 500 may include a processor 502 coupled to internal memories 504 and 506. Internal memories 504 and 506 may be volatile or non-volatile memories, and may also be secure and/or encrypted memories, or unsecure and/or unencrypted memories, or any combination thereof. The processor 502 may also be coupled to a touch screen display 512, such as a resistive-sensing touch screen, capacitive-sensing touch screen infrared sensing touch screen, or the like. Additionally, the display of the receiver device 500 need not have touch screen capability. The receiver device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The receiver device 500 may include a cellular network interface, such as wireless modem chip 516, that enables communication via a cellular data network (e.g., CDMA, TDMA, GSM, PCS, 3G, 4G, LTE, ATSC 3.0, DVB-T2 or any other type of cellular or broadcast data network) and is coupled to the processor 502. The receiver device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port. The receiver device 500 may also include speakers 514 for providing audio outputs. The receiver device 500 may also include a housing 520, constructed of a plastic, metal, or a combination of materials, for containing all or some of the components discussed herein. The receiver device 500 may include a power source 522 coupled to the processor 502, such as a disposable or rechargeable battery. The rechargeable battery may also be coupled to the peripheral device connection port to receive a charging current from a source external to the receiver device 500. The receiver device 500 may also include a physical button 524 for receiving user inputs. The receiver device 500 may also include a power button 526 for turning the receiver device 500 on and off.

Figure 6:
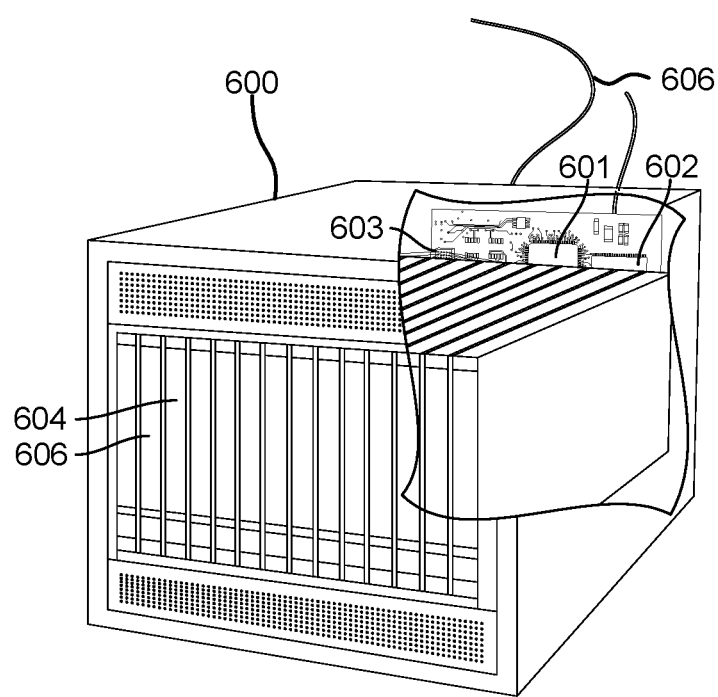
FIG. 6 is a component diagram of an example server suitable for use with various embodiments.

Various embodiments, including the embodiment method described above with reference to FIG. 4, may be implemented on any of a variety of commercially available server devices, such as the server 600 illustrated in FIG. 6. Such a server 600 typically includes a processor 601 coupled to volatile memory 602 and a large capacity nonvolatile memory, such as a disk drive 604. The server 600 may also include a floppy disc drive, compact disc (CD) or digital versatile disc (DVD) drive 606 coupled to the processor 601. The server 600 may also include network access ports 603 coupled to the processor 601 for establishing network interface connections with a network, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 502 and 601 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 504, 506, 602, 604 before they are accessed and loaded into the processors 502 and 601. The processors 502 and 601 may include internal memory sufficient to store the application software instructions. In many devices the internal memory may be a volatile or nonvolatile memory, such as flash memory, or a mixture of both. For the purposes of this description, a general reference to memory refers to memory accessible by the processors 502 and 601 including internal memory or removable memory plugged into the device and memory within the processor 502 and 601 themselves.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more example embodiments, the functions described may be implemented in hardware, software, firmware, or any combination thereof. If implemented in software, the functions may be stored as one or more instructions or code on a non-transitory computer-readable storage medium or a non-transitory processor-readable storage medium. The steps of a method or algorithm disclosed herein may be embodied in processor-executable software that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for receiving media content in a communication device, comprising:

receiving, by a processor of the communication device, an initialization segment associated with a first media broadcast in a first channel;
requesting, by the processor, a second media broadcast in a second channel that is different from the first channel;
receiving, by the processor, an indication that the initialization segment is also associated with the second media broadcast, wherein the received indication includes a notification that a frequency of the initialization segment is being changed or identifies a changed initialization segment frequency;
receiving, by the processor, initialization segments at the changed initialization segment frequency; and
processing, by the processor, the second media broadcast using the initialization segment at the changed initialization segment frequency.

2. The method of claim 1, further comprising:
preventing, by the processor, retrieval of a second initialization segment in response to receiving the indication that the initialization segment is also associated with the second media broadcast.

3. The method of claim 1, wherein the indication that the initialization segment is also associated with the second media broadcast comprises a flag in a service parameter description of the second media broadcast.

4. The method of claim 3, wherein the flag in the service parameter description of the second media broadcast comprises a flag in a User Service Description (USD) associated with the second media broadcast.

5. The method of claim 1, further comprising:
receiving, by the processor, an expiry indication of the initialization segment;
requesting, by the processor, a second initialization segment in response to receiving the expiry indication; and
processing, by the processor, the second media broadcast using the second initialization segment.

6. A method for transmitting media content from a content server, comprising:
providing, by a processor of the content server in a communication network, an initialization segment associated with a first media broadcast in a first channel;
receiving, by the processor, a request from a receiving communication device for a second media broadcast;
providing, by the processor, an indication that the initialization segment is also associated with the second media broadcast in a second channel that is different from the first channel, wherein the indication that the initialization segment is also associated with the second media broadcast enables the receiving communication device to process the second media broadcast using the initialization segment;
providing, by the processor to the receiving communication device, a notification that a frequency of the initialization segment is being changed or identifying a changed initialization segment frequency; and
transmitting, by the processor to the receiving communication device, initialization segments at the changed initialization segment frequency.

7. The method of claim 6, wherein the indication that the initialization segment is also associated with the second media broadcast comprises a flag in a service parameter description of the second media broadcast.

8. The method of claim 7, wherein the flag in the service parameter description of the second media broadcast comprises a flag in a User Service Description (USD) associated with the second media broadcast.

9. The method of claim 6, further comprising:
providing, by the processor to the receiving communication device, an expiry indication of the initialization segment;
receiving, by the processor from the receiving communication device, a request for a second initialization segment in response to providing the expiry indication; and
transmitting, by the processor to the receiving communication device, the second initialization segment,
wherein the second initialization segment enables the receiving communication device to process the second media broadcast using the initialization segment.

10. The method of claim 6, wherein providing, by the processor to the receiving communication device, the notification that the frequency of the initialization segment is being changed or identifying the changed initialization segment frequency comprises changing a repetition interval value in a User Service Description.

11. The method of claim 6, wherein providing, by the processor to the receiving communication device, the notification that the frequency of the initialization segment is being changed or identifying the changed initialization segment frequency further comprises sending a separate notification to the receiving communication device.

12. A communication device, comprising:
a processor configured with processor-executable instructions to perform operations comprising:
receiving an initialization segment associated with a first media broadcast in a first channel;
requesting a second media broadcast in a second channel that is different from the first channel;
receiving an indication that the initialization segment is also associated with the second media broadcast, wherein the received indication includes a notification that a frequency of the initialization segment is being changed or identifies a changed initialization segment frequency;
receiving initialization segments at the changed initialization segment frequency; and
processing the second media broadcast using the initialization segment at the changed initialization segment frequency.

13. The communication device of claim 12, wherein the processor is configured with processor-executable instructions to perform operations further comprising:
preventing retrieval of a second initialization segment in response to receiving the indication that the initialization segment is also associated with the second media broadcast.

14. The communication device of claim 12, wherein the processor is configured with processor-executable instructions to perform operations such that the indication that the initialization segment is also associated with the second media broadcast comprises a flag in a service parameter description of the second media broadcast.

15. The communication device of claim 14, wherein the processor is configured with processor-executable instructions to perform operations such that the flag in the service parameter description of the second media broadcast comprises a flag in a User Service Description (USD) associated with the second media broadcast.

16. The communication device of claim 12, wherein the processor is configured with processor-executable instructions to perform operations further comprising:
receiving an expiry indication of the initialization segment;

requesting a second initialization segment in response to receiving the expiry indication; and processing the second media broadcast using the second initialization segment.

17. A content server, comprising:

a processor configured with processor-executable instructions to perform operations comprising:

providing an initialization segment associated with a first media broadcast in a first channel;

receiving a request from a receiving communication device for a second media broadcast in a second channel that is different from the first channel, wherein the received indication includes a notification that a frequency of the initialization segment is being changed or identifies a changed initialization segment frequency;

receiving initialization segments at the changed initialization segment frequency; and providing an indication that the initialization segment is also associated with the second media broadcast, wherein the indication that the initialization segment is also associated with the second media broadcast is configured to enable the receiving communication device to process the second media broadcast using the initialization segment.

18. The content server of claim 17, wherein the processor is configured with processor-executable instructions to perform operations such that the indication that the initialization segment is also associated with the second media broadcast comprises a flag in a service parameter description of the second media broadcast.

19. The content server of claim 18, wherein the processor is configured with processor-executable instructions to perform operations such that the flag in the service parameter description of the second media broadcast comprises a flag in a User Service Description (USD) associated with the second media broadcast.

20. The content server of claim 17, wherein the processor is configured with processor-executable instructions to perform operations further comprising:

providing an expiry indication of the initialization segment to the receiving communication device;

receiving a request for a second initialization segment from the receiving communication device after providing the expiry indication; and transmitting the second initialization segment to the receiving communication device, wherein the second initialization segment enables the receiving communication device to process the second media broadcast using the initialization segment.

21. The content server of claim 17, wherein providing, to the receiving communication device, the notification that the frequency of the initialization segment is being changed or identifying the changed initialization segment frequency comprises changing a repetition interval value in a User Service Description.

22. The content server of claim 17, wherein providing, to the receiving communication device, the notification that the frequency of the initialization segment is being changed or identifying the changed initialization segment frequency further comprises sending a separate notification to the receiving communication device.

* * * * *